United States Patent
Sumoyama et al.

(10) Patent No.: US 9,948,068 B2
(45) Date of Patent: Apr. 17, 2018

(54) SPARK PLUG

(71) Applicant: NGK SPARK PLUG CO., LTD., Nagoya-shi, Aichi (JP)

(72) Inventors: Daisuke Sumoyama, Nagoya (JP); Tsutomu Shibata, Owariasahi (JP)

(73) Assignee: NGK SPARK PLUG CO., LTD., Nagoya-shi, Aichi (JP)

( * ) Notice: Subject to any disclaimer, the term of this patent is extended or adjusted under 35 U.S.C. 154(b) by 0 days.

(21) Appl. No.: 15/036,572

(22) PCT Filed: Sep. 10, 2014

(86) PCT No.: PCT/JP2014/004649
§ 371 (c)(1),
(2) Date: May 13, 2016

(87) PCT Pub. No.: WO2015/075855
PCT Pub. Date: May 28, 2015

(65) Prior Publication Data
US 2016/0294164 A1    Oct. 6, 2016

(30) Foreign Application Priority Data

Nov. 20, 2013  (JP) .................................. 2013-239616

(51) Int. Cl.
*H01T 13/39*        (2006.01)
*C22C 5/04*         (2006.01)
(Continued)

(52) U.S. Cl.
CPC .............. *H01T 13/39* (2013.01); *B32B 15/01* (2013.01); *B32B 15/018* (2013.01); *C22C 5/04* (2013.01);
(Continued)

(58) Field of Classification Search
CPC ....................................................... H01T 13/39
(Continued)

(56) References Cited

U.S. PATENT DOCUMENTS 5,273,474 A * 12/1993 Oshima .................. H01T 21/02
                                              219/121.64
5,310,373 A *  5/1994 Treiber .................... B21C 23/22
                                              313/136
(Continued)

FOREIGN PATENT DOCUMENTS

CN       1797880 A     7/2006    ............. H01T 13/39
CN     101461106 A     6/2009    ............. H01T 13/20
(Continued)

OTHER PUBLICATIONS

International Search Report issued in corresponding International Patent Application No. PCT/JP2014/004649, dated Oct. 14, 2014.
(Continued)

*Primary Examiner* — Christopher Raabe
(74) *Attorney, Agent, or Firm* — Kusner & Jaffe (57) ABSTRACT

A spark plug that includes a center electrode and a ground electrode. The center electrode is disposed providing a gap with the center electrode. At least one of the center electrode and the ground electrode includes a tip forming the gap. The tip includes a main body portion and a front surface layer. A composition of the main body portion is Pt as a main constituent and Rh of 5 mass % or more and Ni of 0 mass % or more to less than 8 mass %. The front surface layer is disposed at least at a surface radially outside of an axial line extending in a direction from a center of the main body portion to the gap. The front surface layer contains Ni of 8 mass % or more and has a thickness of 2 μm or more.

6 Claims, 4 Drawing Sheets (51) Int. Cl.
  *C22C 19/03* (2006.01)
  *B32B 15/01* (2006.01)
  *C22C 19/05* (2006.01)

(52) U.S. Cl.
  CPC .............. *C22C 19/03* (2013.01); *C22C 19/05* (2013.01); *C22C 19/058* (2013.01)

(58) Field of Classification Search
  USPC ........................................................ 313/141
  See application file for complete search history.

(56) References Cited

U.S. PATENT DOCUMENTS

| | | | |
|---|---|---|---|
| 5,347,196 A * | 9/1994 | Meershoek | H04N 3/185 315/278 |
| 5,440,198 A * | 8/1995 | Oshima | H01T 21/02 313/141 |
| 6,528,929 B1 * | 3/2003 | Matsutani | H01T 13/39 313/141 |
| 7,336,024 B2 | 2/2008 | Yoshimoto et al. | 313/141 |
| 7,569,979 B2 | 8/2009 | Lykowski et al. | 313/143 |
| 8,841,828 B2 * | 9/2014 | Igarashi | F02P 13/00 313/141 |
| 9,027,524 B2 | 5/2015 | Musasa et al. | H01T 13/39 |
| 2006/0152129 A1 | 7/2006 | Yoshimoto et al. | 313/141 |
| 2007/0236123 A1 | 10/2007 | Lykowski et al. | 313/141 |
| 2010/0275869 A1 | 11/2010 | Musasa et al. | 123/169 EL |
| 2013/0099654 A1 * | 4/2013 | Ma | H01T 21/02 313/141 |
| 2013/0147338 A1 * | 6/2013 | Stamper | H01T 13/39 313/141 |

FOREIGN PATENT DOCUMENTS

| | | | |
|---|---|---|---|
| CN | 101904066 A | 12/2010 | ................ C22C 5/04 |
| CN | 103138161 A | 6/2013 | ............. H01T 13/39 |
| EP | 0 418 055 A1 | 3/1991 | ............. H01T 13/39 |
| JP | S60-130081 | 7/1985 | ............. H01T 13/39 |
| JP | H02-230680 A | 9/1990 | ............. H01T 13/20 |
| JP | H05-343156 A | 12/1993 | ............. H01T 13/39 |
| JP | 2002-359050 A | 12/2002 | ............. H01T 13/20 |
| JP | 2004-031300 A | 1/2004 | ................ C22C 5/04 |
| JP | 2004-127681 A | 4/2004 | ............. H01T 13/39 |
| JP | 2004-152682 A | 5/2004 | ................ C22C 5/04 |
| JP | 2006-210325 A | 8/2006 | ................ C22C 5/04 |
| JP | 2006-228688 A | 8/2006 | ................ C22C 5/04 |
| JP | 2012-038733 A | 2/2012 | ................ C22F 1/14 |

OTHER PUBLICATIONS

Office Action with Search Report issued in corresponding Chinese Patent Application No. 201480063619.5 dated Nov. 1, 2016 (English-language translation provided).

* cited by examiner

SPARK PLUG

RELATED APPLICATIONS

This application is a National Stage of International Application No. PCT/JP14/04649 filed Sep. 10, 2014, which claims the benefit of Japanese Patent Application No. 2013-239616, filed Nov. 20, 2013.

FIELD OF THE INVENTION

This invention relates to a spark plug. This invention especially relates to the spark plug that includes a tip on at least one of a center electrode and a ground electrode.

BACKGROUND OF THE INVENTION

A spark plug is used to ignite an internal combustion engine such as a vehicle engine. Generally, the spark plug includes a tubular metal shell, a tubular insulator, a center electrode, and a ground electrode. The insulator is arranged in an inner hole of this metal shell. The center electrode is arranged at the inner hole on a distal end side of the insulator. One end of the ground electrode is bonded to the distal end side of the metal shell. Between the other end of the ground electrode and the center electrode, a spark discharge gap is provided. The spark plug is spark-discharged at the spark discharge gap, which is formed between the distal end portion of the center electrode and the distal end portion of the ground electrode, in a combustion chamber of the internal combustion engine. Thus, the spark plug burns a fuel filled up in the combustion chamber.

As a material forming the center electrode and the ground electrode, a Ni alloy or a similar material is generally used. Regarding oxidation resistance and wear resistance, the Ni alloy is slightly inferior to a precious metal alloy whose main constituent is a precious metal such as Pt and Ir. However, because of its inexpensiveness compared with the precious metal, the Ni alloy is preferably used as the material forming the ground electrode and the center electrode.

Recently, there has been a trend toward high-temperatures in the combustion chamber. Therefore, if spark discharge occurs between the distal end portion of the ground electrode and the distal end portion of the center electrode made of the Ni alloy or a similar material, each distal end portion of the ground electrode and the center electrode opposed to one another may be likely to generate spark erosion. Therefore, the following methods have been developed. Tips are disposed at each distal end portion of the ground electrode and the center electrode opposed to one another to generate the spark discharge at the tips. Thus, the wear resistances of the ground electrode and the center electrode are improved.

As the material forming the tips, a material whose main constituent is a precious metal excellent in the oxidation resistance and spark erosion resistance is often used. The material includes Ir, an Ir alloy, a Pt alloy, or a similar material. To improve durability of the tip, there has been proposed a tip that includes a protective coating layer or a similar layer at a surface of a core material whose main constituent is Ir (for example, see JP-A-2004-31300 and JP-A-2012-38733).

Recently, in a spark plug, to ensure improving high output and fuel economy of an engine, there has been developed a direct-injection gasoline engine, a lean burn engine, or a similar engine. The direct-injection gasoline engine directly injects a fuel around a plug in a fuel chamber. The lean burn engine decreases a mixing ratio of the fuel to the air to allow burning under high oxygen concentration atmosphere.

Such engine requires a spark plug to have oxidation resistance. Accordingly, as a material that forms tips, which are formed at a center electrode and a ground electrode, a Pt alloy, which is known for excellent oxidation resistance, has been considered to ensure providing durability more than an Ir alloy, which is known for excellent spark erosion resistance. In particular, a Pt—Rh alloy, which is formed by containing Rh to Pt, where the oxidation resistance and the spark erosion resistance are improved has been considered as preferable.

However, assume the case of the use of a spark plug with a tip made of the Pt—Rh alloy for the direct-injection gasoline engine. In the direct-injection gasoline engine, intake air gas and fuel are likely to directly hit the tip surface in a lean burn state, which is the high oxygen concentration atmosphere. Accordingly, it has found that abnormal erosion may occur in a specific site at the tip, especially, a side surface on an intake charge mixture valve side of the tip. It has found that the abnormal erosion at the side surface of this tip is likely to occur in the following case. The spark plug is used in the combustion chamber at a high temperature and high oxygen concentration. Further, the tip is placed under conditions where the intake air gas and the fuel are likely to directly hit the surface of the tip and oxygen concentration and the temperature at the periphery of the tip widely change.

JP-A-2002-359050 discloses abnormal erosion occurred in the Ir alloy. The abnormal erosion at the side surface of the tip made of the Pt—Rh alloy differs from the abnormal erosion of JP-A-2002-359050 in a mechanism of the erosion. The precious metal tip containing Ir and 20 mass % of Rh, which is disclosed in JP-A-2002-359050, "generates abnormal erosion in the form along arc hollowing an outer peripheral side surface other than a discharge surface of a discharge portion" (paragraph number 0005). In contrast to this, the tip made of the Pt—Rh alloy generates the abnormal erosion in the form of like the one entire side surface of tip dissipating. The difference between both in the mechanism of wear can also be seen from a difference in a wear form of both.

An advantage of this invention is a spark plug featuring excellent durability. The spark plug includes a tip on at least one of a center electrode and a ground electrode. The spark plug with excellent durability can be achieved by reducing abnormal erosion of the tip.

SUMMARY OF THE INVENTION

[1] In accordance with a first aspect of the present invention, there is provided a spark plug that includes a center electrode and a ground electrode. The ground electrode is disposed to create a gap with the center electrode. At least one of the center electrode and the ground electrode includes a tip forming the gap. The tip includes a main body portion and a front surface layer. A composition of the main body portion is Pt as a main constituent and Rh of 5 mass % or more and Ni of 0 mass % or more to less than 8 mass %. The front surface layer is disposed at least at a surface radially outside of an axial line extending in a direction from a center of the main body portion to the gap. The front surface layer contains Ni of 8 mass % or more and has a thickness of 2 μm or more.

[2] In accordance with a second aspect of the present invention, there is provided a spark plug as described above, wherein the composition of the main body portion is Ni of 0 mass % or more to 1 mass % or less.

[3] In accordance with a third aspect of the present invention, there is provided a spark plug according to [1] or [2], wherein the front surface layer contains Ni of 40 mass % or more and has a thickness of 2 µm or more.

[4] In accordance with a fourth aspect of the present invention, there is provided a spark plug according to any one of [1] to [3], wherein for a region having a thickness of 0.2 mm from a surface of the tip forming the gap to an opposite side from a side that a gap is positioned, a total content proportion of Ni and an element having lower melting point than Ni to a total mass of the region is 7 mass % or less.

[5] In accordance with a fifth aspect of the present invention, there is provided a spark plug according to any one of [1] to [4], wherein the center electrode including the tip or the ground electrode including the tip is formed by bonding a surface where the main body portion is exposed at the tip to the center electrode or the ground electrode.

[6] In accordance with a sixth aspect of the present invention, there is provided a spark plug according to any one of [1] to [5], wherein the case where the tip projects from the ground electrode by 0.15 mm or more and a cross section in an radial direction of an axial line direction extending in a direction from a center of the main body portion to the gap at any given position of the tip projecting by 0.15 mm or more is observed, at an outer peripheral surface in contact with an atmosphere, a part of a curvature radius R of 0.33 mm or more is present.

According to this invention, a tip disposed at least at one of a center electrode and a ground electrode is at least disposed at an outer peripheral surface (may also be referred to as a side surface) in a radial direction of an axial line. The axial line extends in a direction from a center of a main body portion to a gap among a surface of a main body portion having the composition. The tip includes a front surface layer. The front surface layer contains Ni of 8 mass % or more and has a thickness of 2 µm or more. Accordingly, even if the spark plug is used in a combustion chamber at a high temperature and high oxygen concentration, intake air gas is likely to directly hit a surface of the tip, and the tip is placed under conditions where the oxygen concentration and a temperature at periphery of the tip widely change, by reducing abnormal erosion at a side surface of the tip, the spark plug featuring excellent durability can be provided.

DETAILED DESCRIPTION OF THE PREFERRED EMBODIMENTS

Figure 1:
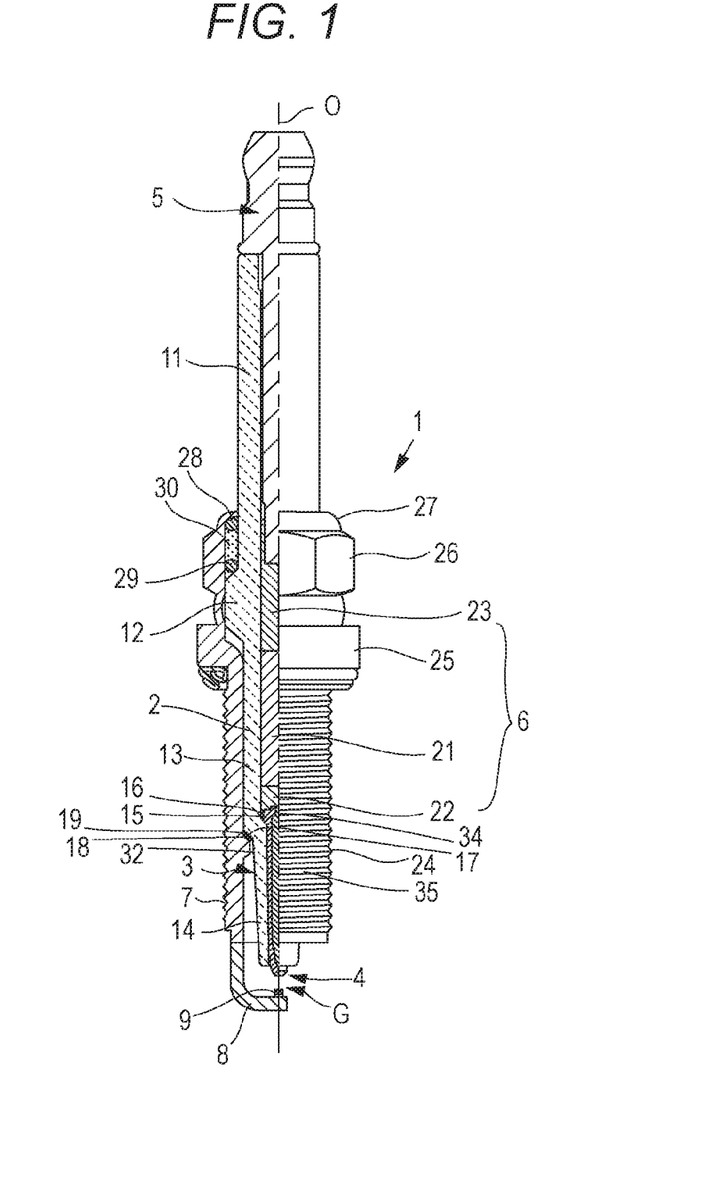
FIG. 1 is a partial cross-sectional overall explanatory view of a spark plug that is one embodiment of a spark plug according to this invention.

FIG. 1 shows a spark plug of a spark plug of one embodiment according to this invention. FIG. 1 is a partial cross-sectional overall explanatory view of a spark plug 1 of the spark plug of one embodiment according to this invention. FIG. 1 describes a lower side of the paper, that is, a side where a ground electrode, which will be described later, is disposed as a distal end direction of an axial line O and an upper side of the paper as a rear end direction of the axial line O.

This spark plug 1, as shown in FIG. 1, includes an approximately cylindrical-shaped insulator 3, an approximately rod-shaped center electrode 4, a terminal metal fitting 5, a connecting portion 6, an approximately cylindrical-shaped metal shell 7, and a ground electrode 8. The insulator 3 has an axial hole 2 extending in the axial line O direction. The center electrode 4 is disposed at the distal end side in the axial hole 2. The terminal metal fitting 5 is disposed at the rear end side in the axial hole 2. The connecting portion 6 electrically connects the center electrode 4 and the terminal metal fitting 5 in the axial hole 2. The metal shell 7 holds the insulator 3. The one end portion of the ground electrode 8 is bonded to the distal end portion of the metal shell 7. The other end portion of the ground electrode 8 is disposed so as to be opposed to the center electrode 4 via the gap G. The ground electrode 8 has a tip 9 at a side surface at the distal end portion.

The insulator 3 has the axial hole 2 extending in the axial line O direction and has the approximately cylindrical shape. The insulator 3 includes a rear end body portion 11, a large-diameter portion 12, a front end body portion 13, and an insulator nose portion 14. The rear end body portion 11 houses the terminal metal fitting 5 and insulates the terminal metal fitting 5 and the metal shell 7. The large-diameter portion 12 projects radially outward at the distal end side with respect to this rear end body portion. The front end body portion 13 houses the connecting portion 6 at the distal end side of this large-diameter portion 12. The front end body portion 13 has a smaller outer diameter than the large-diameter portion 12. The insulator nose portion 14 houses the center electrode 4 at the distal end side of this front end body portion 13. The insulator nose portion 14 has a smaller outer diameter and internal diameter than the front end body portion 13. Inner peripheral surfaces of the front end body portion 13 and the insulator nose portion 14 are connected via a shelf portion 15. A collar portion 16, which will be described later, of the center electrode 4 is disposed so as to be in contact with this shelf portion 15, securing the center electrode 4 to the inside of the axial hole 2. Outer peripheral surfaces of the front end body portion 13 and the insulator nose portion 14 are connected via a step part 17. A tapered portion 18, which will be described later, of the metal shell 7 is in contact with this step part 17 via a plate packing 19, securing the insulator 3 to the metal shell 7. The insulator 3 is secured to the metal shell 7 with the end portion of the insulator 3 in the distal end direction projected from the front end surface of the metal shell 7. The insulator 3 is preferably made of a material featuring mechanical strength, thermal strength, and electrical strength. As such material, for example, a ceramic sintered material mainly containing alumina can be listed.

The axial hole 2 of the insulator 3 internally includes the center electrode 4 at the distal end side and the terminal metal fitting 5 at the rear end side. Between the center electrode 4 and the terminal metal fitting 5, the connecting portion 6 is disposed. The connecting portion 6 secures the center electrode 4 and the terminal metal fitting 5 to the inside of the axial hole 2 and electrically connects the center electrode 4 and the terminal metal fitting 5. The connecting portion 6 is formed of a resistor 21, a first seal body 22, and a second seal body 23. The resistor 21 is arranged to reduce propagation noise. The first seal body 22 is disposed between this resistor 21 and the center electrode 4. The second seal body 23 is disposed between this resistor 21 and the terminal metal fitting 5. The resistor 21 is formed by sintering a composition containing glass powder, non-metal conductive powder, metal powder, or similar powder. A resistance value of the resistor 21 is usually at 100Ω or more. The first seal body 22 and the second seal body 23 are formed by sintering a composition containing the glass powder, the metal powder, or similar powder. A resistance value of the first seal body 22 and the second seal body 23 is usually 100 mΩ or less. The connecting portion 6 of this embodiment is formed of the resistor 21, the first seal body 22, and the second seal body 23. However, the connecting portion 6 may also be formed of at least one of the resistor 21, the first seal body 22, and the second seal body 23.

The metal shell 7 has the approximately cylindrical shape. The metal shell 7 is formed so as to hold the insulator 3 by internally mounting the insulator 3. A screw portion 24 is formed at the outer peripheral surface of the metal shell 7 in the distal end direction. Using this screw portion 24, the spark plug 1 is mounted to a cylinder head (not shown) of the internal combustion engine. The metal shell 7 has a flange-shaped gas seal portion 25 at the rear end side of the screw portion 24. The metal shell 7 has a tool engagement portion 26 at the rear end side of the gas seal portion 25 and a crimping portion 27 at the rear end side of the tool engagement portion 26. The tool engagement portion 26 engages a tool such as a spanner and a wrench. At an annular space formed between the inner peripheral surfaces of the crimping portion 27 and the tool engagement portion 26 and the outer peripheral surface of the insulator 3, ring-shaped packings 28 and 29 and a talc 30 are disposed, thus securing the insulator 3 to the metal shell 7. The distal end side of the inner peripheral surface of the screw portion 24 is disposed to have a space to the insulator nose portion 14. The tapered portion 18 and the step part 17 of the insulator 3 are in contact via the annular plate packing 19. The tapered portion 18 radially expands in a taper shape at the rear end side of a projection portion 32 projecting radially inward. The metal shell 7 can be made of a conductive steel material, for example, low-carbon steel.

The terminal metal fitting 5 is a terminal nut to apply a voltage for spark discharge between the center electrode 4 and the ground electrode 8 from the outside to the center electrode 4. The terminal metal fitting 5 is inserted into the axial hole 2 with a part of the terminal metal fitting 5 exposed from the rear end side of the insulator 3 and is secured with the second seal body 23. The terminal metal fitting 5 can be made of a metallic material such as low-carbon steel.

The center electrode 4 has a rear end portion 34 and a rod-shaped portion 35. The rear end portion 34 is in contact with the connecting portion 6. The rod-shaped portion 35 extends from the rear end portion 34 to the distal end side. The rear end portion 34 has the collar portion 16 projecting radially outward. The collar portion 16 is disposed in contact with the shelf portion 15 of the insulator 3. Further, between the inner peripheral surface of the axial hole 2 and the outer peripheral surface of the rear end portion 34, the first seal body 22 is filled up. Accordingly, the center electrode 4 is secured to the inside of the axial hole 2 of the insulator 3 with the distal end of the center electrode 4 projecting from the front end surface of the insulator 3, thus insulated and held to the metal shell 7. The rear end portion 34 and the rod-shaped portion 35 in the center electrode 4 can be made of a known material used for the center electrode 4 such as the Ni alloy. The center electrode 4 may be formed of an outer layer and a core portion. The outer layer is made of the Ni alloy or a similar material. The core portion is made of a material having coefficient of thermal conductivity higher than the Ni alloy. The core portion is formed so as to be concentrically embedded into an axial center portion at the inside of this outer layer. As the material forming the core portion, for example, Cu, a Cu alloy, Ag, an Ag alloy, and pure Ni can be listed.

The ground electrode 8 is, for example, formed into an approximately prism shape. The one end portion of the ground electrode 8 is bonded to the distal end portion of the metal shell 7 and is flexed (i.e., bent) into an approximately L shape in mid-course. The other end portion of the ground electrode 8 is formed so as to be opposed to the distal end portion of the center electrode 4 via the gap G. The ground electrode 8 can be made of a known material used for the ground electrode 8, such as the Ni alloy. Similar to the center electrode 4, at an axis core portion of the ground electrode, the core portion made of the material having higher coefficient of thermal conductivity than the Ni alloy may be disposed.

Figure 4:
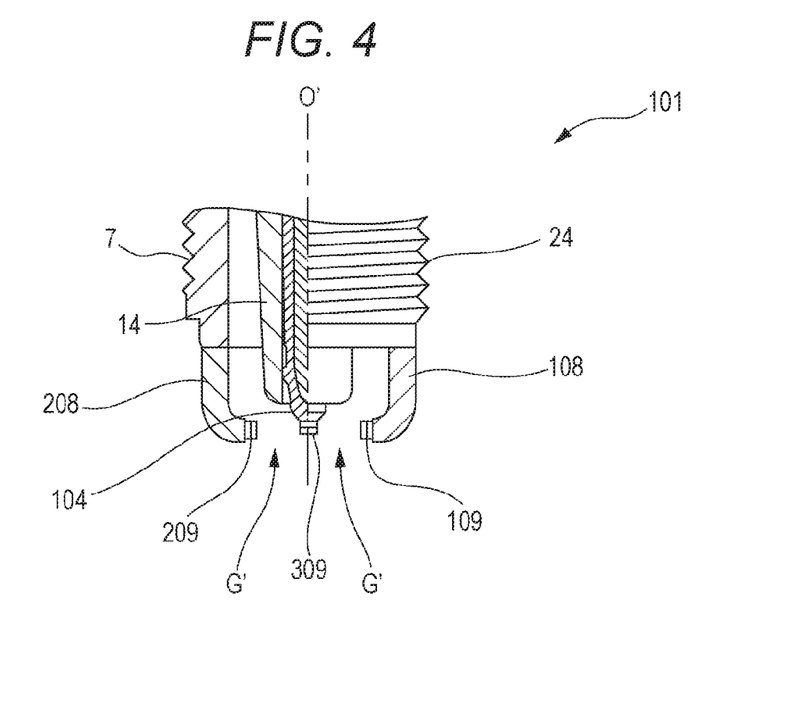
FIG. 4 is a partial sectional explanatory view of the main part of the spark plug that is a spark plug of another one embodiment according to this invention.

The tip 9 has a columnar shape in this embodiment and is disposed at only the ground electrode 8. The shape of the tip 9 is not especially limited. The tip 9 may be disposed only at the center electrode 4, or may be disposed at both the ground electrode 8 and the center electrode 4. It is only necessary that at least one of the tips, which are disposed at the ground electrode 8 and the center electrode 4, is formed of the tip made of the material having properties, which will be described later. The other tip may be made of the known material used as the tip. The tip 9 is bonded to the surface of the ground electrode 8 opposed to the center electrode 4 by an appropriate method such as a laser beam welding and a resistance welding. The gap G of the spark plug 1 of this embodiment is the shortest distance between the tip 9 disposed at the ground electrode 8 and the center electrode 4. This gap G is usually set to 0.3 to 1.5 mm. As shown in FIG. 4, assume the case of a spark plug 101 where side surfaces of a tip 309 disposed at a center electrode 104 and front end surfaces of tips 109 and 209 disposed at ground electrodes 108 and 208 are opposed. The shortest distance between the respective opposed surfaces where the tip 309 disposed at the center electrode 104 is opposed to the tip 109 disposed at the distal end portion of the ground electrode 108 becomes a gap G'. The spark discharge occurs at this gap G'.

The following describes the tip, the discriminative part of this invention, in detail.

Figure 2:
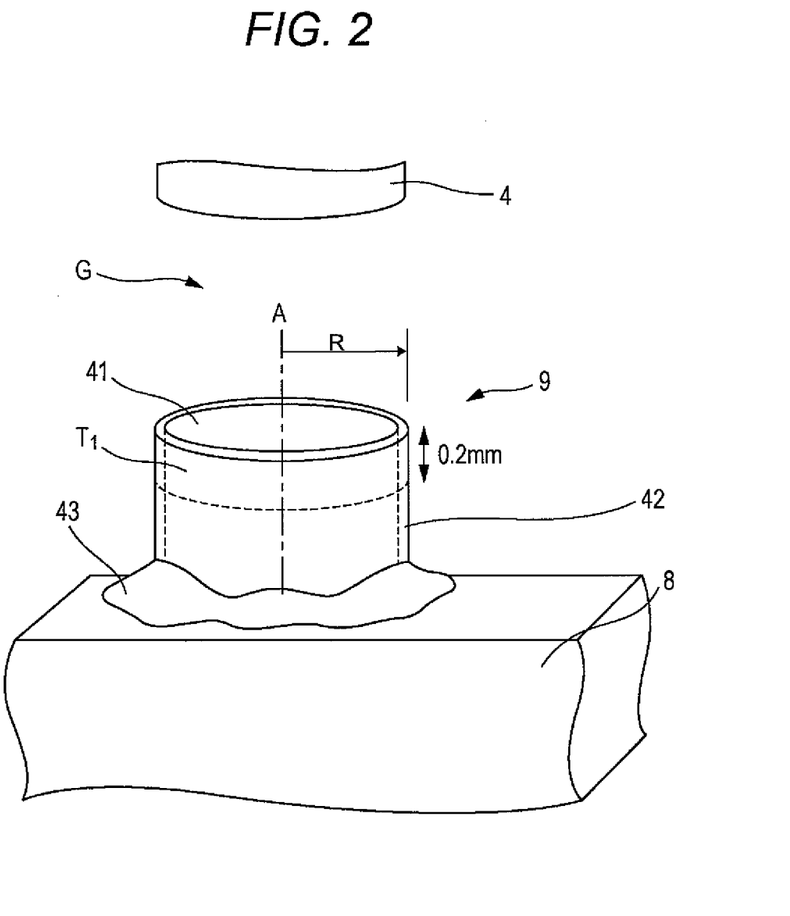
FIG. 2 is an explanatory view of a main part showing an enlarged tip in the spark plug in FIG. 1.

As shown in FIG. 2, the tip 9 of this embodiment includes a main body portion 41 and a front surface layer 42. The front surface layer 42 is disposed at a side peripheral surface of this main body portion 41, that is, an outer peripheral surface (may also be referred to as the side surface) in the radial direction of an axial line A extending in a direction from the center of the main body portion 41 to the gap G.

The composition of the main body portion 41 is Pt as a main constituent and 5 mass % or more of Rh and 0 mass % or more to less than 8 mass % of Ni. The composition of the main body portion 41 is preferably Pt as the main constituent and 5 mass % or more to 45 mass % or less of Rh and 0 mass % or more to 7 mass % or less of Ni. The composition of the main body portion 41 is more preferably Pt as the main constituent and 5 mass % or more to 45 mass % or less of Rh and 0 mass % or more to 1 mass % or less of Ni. The "main constituent" means a constituent whose mass proportion is the most among the constituents contained in the main body portion 41. The main body portion 41 whose composition is within the range features excellent spark erosion resistance and oxidation resistance. However, in the case where the entire surface of this main body portion 41 is exposed, abnormal erosion, which will be described later, is likely to occur. In particular, a smaller content proportion of Ni is likely to generate the abnormal erosion. However, since the tip of this invention at least has the front surface layer at the surface where the abnormal erosion is likely to occur in the surface of the main body portion, allowing reducing the abnormal erosion.

First, the following describes the abnormal erosion occurred in the tip 9. Up to the present, the tip 9 made of the Pt alloy has been considered to have excellent spark erosion resistance and oxidation resistance. However, assume the case where the spark plug is operated in the combustion chamber at the high temperature and high oxygen concentration for long time, the intake air gas is likely to directly hit the surface of the tip 9, and the tip 9 is placed under the conditions where the oxygen concentration and the temperature at periphery of the tip 9 widely change. This sometimes caused a phenomenon (the abnormal erosion) of dissipation of a specific site of the tip 9 (for example, the side surface of the tip 9). The phenomenon of dissipation of this tip 9 occurs at the site of the tip 9 where the intake air gas is likely to directly hit but does not occur at the site facing the side with an exhaust valve. This phenomenon differs from spark erosion where a discharge surface of the tip 9 dissipates due to spark discharge. This phenomenon also differs from simple oxidative consumption where oxidation of the tip 9 dissipates a part of the entire surface of the tip 9. Accordingly, the phenomenon, which differs from the spark erosion and the oxidative consumption, where the specific site of the tip 9 dissipates is referred to as the "abnormal erosion."

The abnormal erosion is especially likely to occur in the tip 9 whose content proportion of Rh of 5 mass % or more and content proportion of Ni of less than 8 mass %, in particular, 7 mass % or less among the tips 9 made of the Pt alloy. On the other hand, the tip 9 whose composition is within the range features excellent spark erosion resistance and oxidation resistance. Accordingly, as long as the abnormal erosion can be reduced, the spark plug featuring good durability can be provided. Therefore, the inventors have devised that disposing the front surface layer 42, which will be described later, at least at the surface where the abnormal erosion is likely to occur among the surface of the main body portion 41 with the composition to reduce the abnormal erosion. Thus, the inventors have arrived at the present invention.

The front surface layer 42 contains Ni of 8 mass % or more, and the thickness of the front surface layer 42 is 2 μm or more. Preferably, the front surface layer 42 contains Ni of 40 mass % or more, and the thickness of the front surface layer 42 is 2 μm or more. When the content proportion of Ni at the front surface layer 42 is within the range and a thickness of a part with the content proportion of Ni being 8 mass % or more, preferably, 40 mass % or more is 2 μm or more, Rh contained in the main body portion 41 is less likely to oxidize. As a result, the abnormal erosion is less likely to occur in the tip 9. The content proportion of Ni being less than 8 mass % fails to sufficiently form a film of a Ni oxide, being likely to generate the abnormal erosion. A thickness of the front surface layer 42 of less than 2 μm fails to form a fine film regardless of the composition. This fails to obtain an effect of reducing the abnormal erosion brought by disposing the front surface layer 42 at the surface of the main body portion 41. A thickness of the front surface layer 42 of less than 2 μm mutually diffuses elements of the main body portion 41 and the front surface layer 42 with an elapse (i.e., passage) of operating time of the spark plug 1. This decreases the effect of reducing the abnormal erosion brought by the front surface layer 42.

The reason that disposing the front surface layer 42 at least at a part of the surface of the main body portion 41 reduces the abnormal erosion is probably because of the following. First, it is considered that the abnormal erosion occurs by a mechanism such as the following. Under an environment where the tip is placed when the abnormal erosion occurs in the tip, the intake air gas directly hits the surface of the tip from the intake charge mixture valve side. Accordingly, the intake air gas is likely to accumulate at the spot. When the oxygen concentration locally increases, the temperature rapidly drops at the same time. Afterwards, burning rapidly increases the temperature and reduces the oxygen concentration at the same time. Under the environment of the tip being placed, such changes in atmosphere are repeated. Like the inside of the fuel chamber of the internal combustion engine, under the environment of less oxygen compared with the atmosphere, dissociation pressure of oxygen of Rh oxide is at a region where a cycle of oxidation and reduction is likely to occur compared with dissociation pressure of oxygen of Pt and Ni oxide. Accordingly, under the oxidative atmosphere where the oxygen concentration is high and the temperature is comparatively low, the Rh oxidizes and forms an Rh oxide. Afterwards, under reductive atmosphere where the oxygen concentration is lower and the temperature is comparatively high, the Rh oxide is reduced and forms metal Rh. In this manner, the formation of the Rh oxide and the reduction to the metal Rh are repeated at the surface of the tip. As long as the changes in the oxygen concentration and the temperature are not so large, when the metal Rh does not oxidize and remains intact or the metal Rh oxidizes and forms the fine film of Rh oxide, this should exhibit the excellent oxidation resistance. However, the Rh oxide and the metal Rh differ in the volume. The oxidation of the metal Rh forms the Rh oxide and increases the volume. The reduction of the Rh oxide forms the metal Rh and decreases the volume. Thus, repeated oxidations and reductions at the surface of the tip form the surface of the tip 9 into a sponge-like structure. The sponge-like surface of the tip is likely to peel off and drop, generating the phenomenon called abnormal erosion. The reasons that pure Pt tip and an Ir alloy tip do not generate such phenomenon are as follows. The Pt originally has extremely high dissociation pressure of oxygen. Therefore, it is considered that under the environment of less oxygen, such as the inside of the combustion chamber of the internal combustion engine, the Pt does not oxidize. Ir is likely to generate $IrO_3$, a volatile oxide, even at a slight oxygen concentration. Therefore, it is considered that the change in atmosphere does not generate the cycle of oxidation and reduction.

On the other hand, assume the case where the front surface layer 42 that contains Ni more than the main body portion 41 is disposed at least at a part of the surface of the main body portion 41 containing Pt and Rh. Since the Ni oxide has low dissociation pressure of oxygen compared with that of the Rh oxide, the Ni oxide is likely to oxidize and is less likely to be reduced. Accordingly, a Ni oxide film is formed at the surface of the tip 9. That is, even if the tip 9 is placed under the environment where the Rh oxidizes and is reduced, the Ni oxidizes and is left to form the Ni oxide, being less likely to be reduced. Covering the surface of the tip 9 with the Ni oxide film sets the oxygen concentration near the surface of the main body portion 41 to equal to or less than the dissociation pressure where the Rh oxidizes, thus the Rh is less likely to oxidize. Disposing the front surface layer 42 at the surface of the main body portion 41 thus causes the oxidation and reduction of Rh to be less likely to occur at the surface of the main body portion 41. This prevents the surface of the tip 9 from being the sponge, ensuring reducing the abnormal erosion. The Ni is often the main constituent of the ground electrode 8 and the center electrode 4. Accordingly, welding the tip 9 and the ground electrode 8 or the center electrode 4 is likely to cause diffusion between a formed fusion portion 43 and the front surface layer 42. Accordingly, the front surface layer 42 is less likely to peel off at a boundary between the fusion portion 43 and the front surface layer 42. This provides the effect of reducing the abnormal erosion brought by the front surface layer 42 over a long period of time.

The front surface layer 42 preferably contains a metal element having a face-centered cubic structure identical to the Pt. Among such metal elements, it is especially preferable that the front surface layer 42 contains the metal element that is completely solidified with the Pt. As such element, Pt can be listed. That is, the front surface layer 42 preferably contains the Pt as an element other than the Ni. When the front surface layer 42 is the metal element having the face-centered cubic structure and contains the metal element completely solidified with the Pt, a precipitate is less likely to be formed at the inside of the front surface layer 42. Furthermore, by the mutual diffusion of the elements between the main body portion 41 and the front surface layer 42, the volume does not widely change. This provides good adhesion property, ensuring reducing a crack inside the front surface layer 42 and peeling of the front surface layer 42. A decline of coefficient of thermal conductivity of the tip 9 itself due to the mutual diffusion of the elements can be reduced to the minimum, ensuring reducing overheat of the tip 9.

The front surface layer 42 preferably has the content proportion of an element having higher melting point than that of the Rh being less than 30 mass % with respect to the total mass of the front surface layer 42, more preferably 10 mass % or less, and the most preferably 1 mass % or less. As elements having higher melting point than that of the Rh, for example, W, Mo, Ta, Nb, Hf, Ir, Ru, and Re can be listed. These elements are likely to be fragile by alloying with the Ni. Compared with the Pt and the Rh, these elements have low dissociation pressure of oxygen, being likely to oxidize inside the front surface layer 42. Therefore, a too large content proportion of these elements, due to compressive stress caused by internal oxidation, is likely to crack the front surface layer 42 and a boundary part between the main body portion 41 and the front surface layer 42. Accordingly, the application of thermal cycle is likely to peel the front surface layer 42. Therefore, the smaller content proportion of these elements in the front surface layer 42 can prevent the front surface layer 42 from peeling. These elements having high melting point are preferably reduced within the content proportion in the case of being contained in the main body portion 41 as well. Because if a large amount of these elements is contained in the main body portion 41, by the use of the spark plug 1, these elements in the main body portion 41 diffuses into the front surface layer 42. Accordingly, similar to the case of containing these elements in the front surface layer 42, these elements adversely effect the front surface layer 42.

With the front surface layer 42, the content proportion of the elements having lower melting point than Ni is preferable to be less than 10 mass % to the total mass of the front surface layer 42, and the most preferable not to contain such elements. As the elements having lower melting point than Ni, for example, Fe, Al, Si, Co, Cu, Au, and Ag can be listed. Since these elements have low melting point, the smaller the content proportion of these elements in the front surface layer 42, deterioration of the spark erosion resistance of the front surface layer 42 can be reduced.

With the tip 9 in this invention, it is only necessary that the composition of the main body portion 41 be Pt as the main constituent, Rh of 5 mass % or more, Ni of 0 mass % or more to less than 8 mass %, and the composition of the front surface layer 42 be Ni of 8 mass % or more. The main body portion 41 and the front surface layer 42 each may be the content proportion smaller than 5 mass % and may contain inevitable impurities. As the inevitable impurities in the main body portion 41, for example, Al, Si, Fe, and Cu can be listed. As the inevitable impurities in the front surface layer 42, for example, Al, Si, Mn, and P can be listed. The smaller content proportion of these inevitable impurities is preferred. However, the inevitable impurities may be contained within the range of ensuring solving the problem of this invention. Assuming the total mass of the above-described constituents as 100 pts·mass, the proportion of one kind of the above-described inevitable impurities may be 0.1 pts·mass or less and the total proportion of the all kinds of contained inevitable impurities may be 0.2 pts·mass or less.

Figure 3:
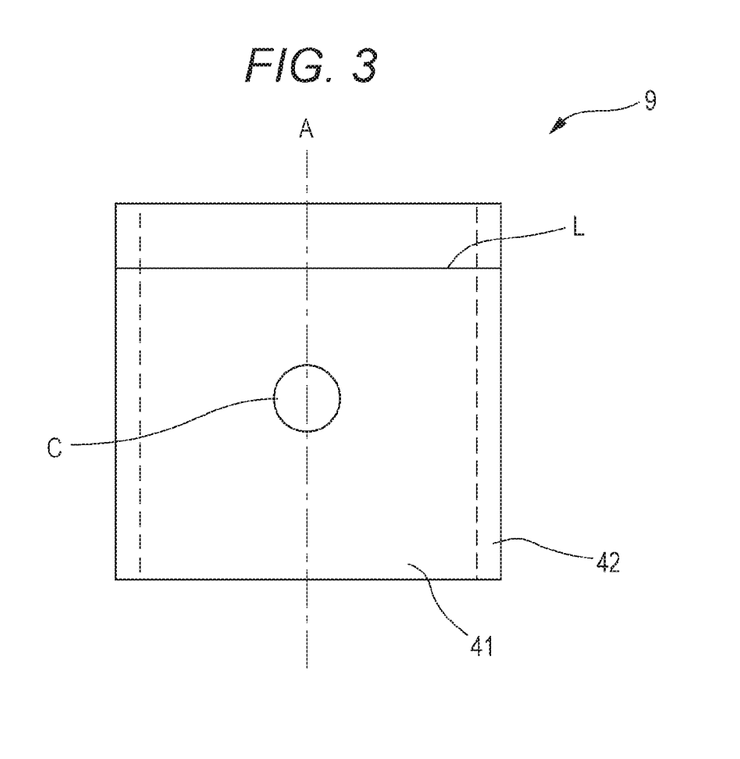
FIG. 3 is a sectional explanatory view showing a position where a composition of the tip is measured.

The content proportion of each constituent in the main body portion 41 and the front surface layer 42 can be obtained as follows. First, the tip 9 is cut across the cross section including the axial line A to expose the cut cross section. As shown in FIG. 3, the composition of the main body portion 41 is found as follows. Wavelength Dispersive X-ray Spectrometer (WDS) analysis is performed on the proximity of the center at the cut cross section with an EPMA to measure a mass composition at each measurement position. That is, a point passing through a center of a line segment from the end portion to the end portion of the cut cross section in the axial line A direction and being the center of the line segment from the end portion to the end portion of the cut cross section in the direction perpendicular to the axial line A is assumed as a center point C. An analysis value at a region of a spot diameter of 100 μm at this center point C is regarded as the composition of the main body portion 41. For the composition of the front surface layer 42, the composition at the measurement point can be obtained as the composition of the front surface layer 42 by analyzing the region of the spot diameter of 1 μm at the position inside 2 μm from the end portion of the cut cross section.

The thickness of the front surface layer 42 can be obtained as follows. Elementary analysis is conducted on a line segment L, which is in the direction perpendicular to the axial line A, at intervals of 1 μm. At the measured points from the end portion to the other end of the line segment L, the length of a part where the content proportion of Ni is 8 mass % or more is the thickness. The front surface layer 42 at the thickness of 20 μm or more may be analyzed at intervals of 10 μm. The front surface layer 42 is disposed at the surface of the main body portion 41. Accordingly, the point at which the content proportion of Ni is 8 mass % or more is usually present at a constant length from one end to the other end on the line segment L. The elementary analysis on a plurality of the any given line segments L in the direction perpendicular to the axial line A allows obtaining the thickness at any given position at the side surface of the tip 9.

It is only necessary that the front surface layer 42 be at least disposed at a site where the intake air gas is likely to directly hit among the entire surface of the main body portion 41, or may be disposed at the entire surface of the main body portion 41. The site where the intake air gas is likely to directly hit it is as follows. In the spark plug 1 shown in FIG. 1, the site for the tip 9 to be bonded to both the center electrode 4 and the ground electrode 8 is also a side peripheral surface of the main body portion 41, namely, an outer peripheral surface of the main body portion 41 in the radial direction of the axial line A. In the spark plug 101 shown in FIG. 4, the site for the tip 309 joined to the center electrode 104 is the entire surface other than the surface joined to the center electrode 104. The sites for the tips 109 and 209 joined to the ground electrodes 108 and 208 are the surfaces facing the distal end side of an axial line O' among the side peripheral surfaces of the main body portion.

The front surface layer 42 may be disposed at the entire surface of the main body portion 41. However, the front surface layer 42 is preferably not disposed at the surface joined to the ground electrode 8. That is, the following is preferred. The resistance welding, the laser beam welding, or the laser beam welding after performing the resistance welding is performed on the surface where the main body portion 41 is exposed at the tip 9 to the ground electrode 8. The surface and the ground electrode 8 are bonded to form the ground electrode 8 having the tip 9. The intake air gas does not directly hit the surface of the tip 9 joined to the ground electrode 8; therefore, the abnormal erosion does not occur in the surface. Accordingly, even with the front surface layer 42, the effect of the present invention of the application cannot be obtained. In the case where the front surface layer 42 is disposed at the surface of the tip 9 joined to the ground electrode 8, as described later, when bonding the tip 9 to the ground electrode 8 by the resistance welding or the laser beam welding, or both the resistance welding and the laser beam welding, the tip 9, the ground electrode 8, and a similar component melt. The melted particles possibly disperse and accumulate at the periphery of the bonding portion. This possibly fails to maintain the quality of the spark plug, resulting in a manufacturing failure. Accordingly, at least a part of the surface of the tip 9 bonded to the ground electrode 8 is preferably formed of the main body portion 41. The entire surface of the surface is especially preferable to be formed of only the main body portion 41.

Figure 5:
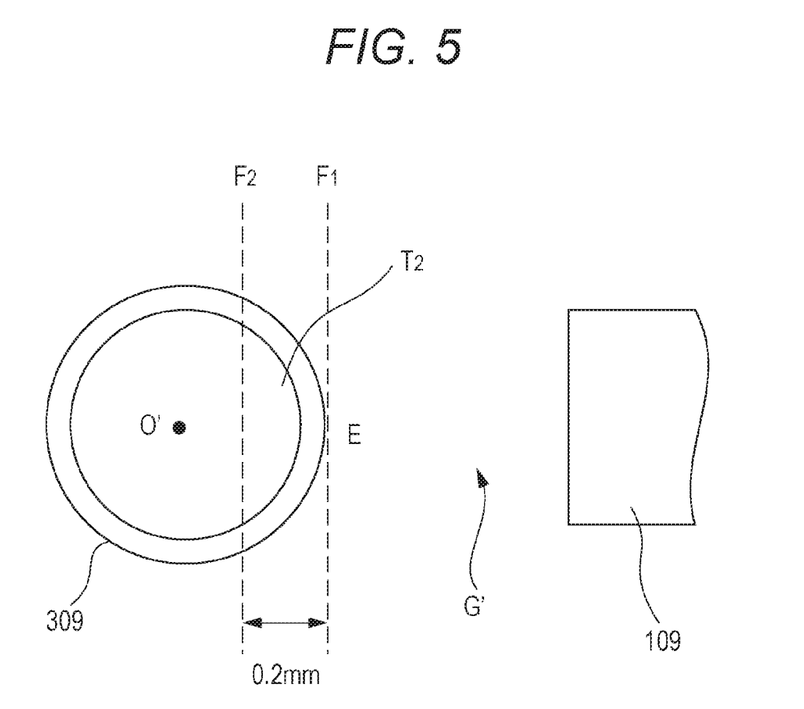
FIG. 5 is an explanatory view of a top surface of the tip showing a region where a composition of a low-melting point element is measured.

Regarding a region at the thickness of 0.2 mm from the front end surface of the tip 9 forming the gap G to the opposite side from the side that the gap G is positioned, a total content proportion of Ni and the elements having lower melting point than Ni to the total mass of the region is preferable to be more than 0 mass % to 7 mass % or less. Like the spark plug 1 shown in FIG. 1, in the case where the gap G is formed between the distal end of the center electrode 4 and the front end surface of the column-shaped tip 9 disposed at the ground electrode 8, as shown in FIG. 2, a region $T_1$ at the tip 9 is the region $T_1$ of the distal end portion of the column-shaped tip 9 at the thickness of 0.2 mm. The region $T_1$ has a disk-shaped body. The region $T_1$ includes the main body portion 41 and the front surface layer 42. In the case where the region in the range of thickness 0.2 mm from the front end surface of the tip 9 includes the fusion portion 43, which is formed when welding the tip 9 to the ground electrode 8, the region includes the main body portion 41, the front surface layer 42, and the fusion portion 43. Like the spark plug 101 shown in FIG. 4, assume the case where the gaps G' are formed between side surfaces of the tip 309, which is disposed at the center electrode 104, and front end surfaces of the tips 109 and 209, which are disposed at the ground electrodes 108 and 208. As shown in FIG. 5, a region $T_2$ in the tip 309 disposed at the center electrode 104 is the region $T_2$ included between a tangent $F_1$ and a second tangent $F_2$. The tangent $F_1$ is on a point E. The point E is the closest from the tip 109, which is disposed at the ground electrode 108, viewed from the distal end side of the tip 309 in the axial line O' direction. The second tangent $F_2$ moves from the tangent $F_1$ toward the opposite side from the side that the gap G' is positioned by 0.2 mm. The region $T_2$ has an arc-cutout-pillar-shaped body. As elements having lower melting point than Ni, for example, Fe, Al, Si, Co, Cu, Au, and Ag can be listed.

When the total content proportion of the Ni and the elements having lower melting point than Ni in the regions $T_1$ and $T_2$ is within the range, this allows providing the spark plug that reduces the abnormal erosion and features excellent wear resistance. Ni and the elements having lower melting point than Ni are mainly contained in the front surface layer 42. Accordingly, the total content proportion of Ni and the elements having lower melting point than Ni in the regions $T_1$ and $T_2$ shows a volume occupied by the front surface layer 42 at the regions $T_1$ and $T_2$ to some extent. As described above, the thickness of the front surface layer 42 is only necessary to be 2 μm or more. The upper limit value of the thickness may be set appropriately in a range that can achieve the problem of this invention, for example, equal to or less than the diameter of the main body portion 41. However, the thicker the front surface layer 42 is, the more the abnormal erosion can be reduced. Meanwhile, the thicker the front surface layer 42 is, the smaller the volume of the main body portion is, adversely deteriorating the wear resistance. Accordingly, designing the total content proportion of Ni and the elements having lower melting point than Ni in the regions $T_1$ and $T_2$ within the range can provide the spark plug that reduces the abnormal erosion and features excellent wear resistance.

The total content proportion of Ni and the elements having lower melting point than Ni at the regions in the tip can be measured as follows. First, the tip is cut at the position of 0.2 mm from the front end surface of the tip forming the gap toward the opposite side from the side that the gap G is positioned. After dissolving the disk-shaped body at the distal end side of the cut tip, chemical analysis (ICP emission spectrometry) can measure the mass proportion of the elements.

The tip 9 has a columnar shape in this embodiment. However, the shape of the tip 9 is not especially limited. As the shape other than the columnar shape, an appropriate shape, such as an elliptic cylinder shape, a prismatic shape, and a plate shape can be employed. The more the tip 9 projects from the surface of the ground electrode 8 and the more the tip has the shape where the intake air gas is likely to directly hit, the abnormal erosion is likely to occur. Accordingly, when the tip of this invention is the tip meeting both the following two conditions, the abnormal erosion can further be reduced. (1) The tip projects from the surface of the ground electrode by 0.15 mm or more. (2) At least a part of a curvature radius R of an outline of the cut cross section obtained by cutting at the cross section perpendicular to the axial line A of the tip at any given position of the tip disposed at the ground electrode at 0.15 mm or more from the surface of the ground electrode to the direction perpendicular to the surface is 0.33 mm or more. That is, when observing the cut cross section, at the outer peripheral surface in contact with the atmosphere, the part at the curvature radius R of 0.33 mm or more is present.

As the tip 9 meeting the conditions (1) and (2), for example, a column-shaped tip at a radius of 0.33 mm or more and a height of 0.15 mm or more can be listed. Not only in the case where the tip 9 is disposed at the ground electrode 8 but also in the case where the tip 9 is disposed at the center electrode, the tip meeting both conditions (1) and (2) can further obtain the effect. When the tip projects from the surface of the ground electrode by 0.6 mm or more, the abnormal erosion is further likely to occur, allowing obtaining the effect of this invention.

The tip may include a diffusion layer between the main body portion and the front surface layer as a modification. Performing heat treatment on the tip with the front surface layer at the surface of the main body portion mutually diffuses the elements between the main body portion and the front surface layer. The diffusion layer is a layer thus formed. Accordingly, the diffusion layer has a gradient structure where the composition gradually changes from the composition of the main body portion to the composition of a front surface portion of the front surface layer. The tip with such gradient structure provides good adhesion property between the main body portion and the front surface layer. This is less likely to peel the front surface layer from the main body portion, providing an effect of reducing the abnormal erosion brought by the front surface layer over a long period of time.

Considering the adhesion property between the main body portion and the front surface layer, the thickness of the diffusion layer is preferably at least 2 μm or more. However, too thick diffusion layer promotes alloying the main body portion and the front surface layer. This declines coefficient of thermal conductivity, and the spark erosion is likely to occur. Therefore, the thickness of the diffusion layer is preferable to be less than 200 μm. When the thickness of the diffusion layer is within the range, this provides good adhesion property between the main body portion and the front surface layer while ensuring the spark erosion resistance, causing the front surface layer to be less likely to peel off from the main body portion. The thickness of the diffusion layer can be obtained similar to the case of obtaining the thickness of the front surface layer. That is, as shown in FIG. 3, the elementary analysis is conducted on the any given line segment L, which is in the direction perpendicular to the axial line A at the cut cross section of the tip. At the measured points from the end portion toward the other end of the line segment L, the length on the line segment L in the region where the content proportion of Ni gradually fluctuates can be obtained as the thickness of the diffusion layer. Here, the content proportion both of Ni gradually fluctuates, however, in most cases, the content proportion of Ni decreases from the front surface layer of large content proportion of Ni to the main body portion of small content proportion of Ni. However, in the case where the elements constituting the main body portion and the front surface layer is three or more and the mutual diffusion between the main body portion and the front surface layer forms a precipitate, the content proportion of Ni possibly increases from the surface to the center of the tip. Even in this case, as long as the content proportion is within the range of this invention, the effect of reducing the abnormal erosion can be obtained.

The spark plug 1 is, for example, manufactured as follows. First, for the tip 9, a core material, which becomes the main body portion 41, is manufactured. Forming the front surface layer 42 at the surface of this core material manufactures the spark plug 1.

To manufacture the core material, which becomes the main body portion 41, first, metal constituents are combined such that the content proportion of each constituent becomes within the above-described range, thus raw material powder is prepared. Arc melting is performed on this raw material powder to form an ingot. This ingot is hot forged to form a rod material. Next, this rod material is groove-rolled by several times, and if necessary, swaging is performed. Then, by performing a wire drawing treatment by die drawing, the round rod material with a circular cross section is formed. This round rod material is cut to a predetermined length. The front surface layer is formed at the surface of this round rod material. The round rod material with this front surface layer formed is cut to the desired length as the tip 9. Thus, the tip 9 with the front surface layer 42 at the surface of the main body portion 41 is manufactured. The shape of the core material, which will be the main body portion 41, is not limited to the columnar shape. For example, the wire drawing treatment is performed on the ingot with a quadrangular die to process the ingot into a square log. The square log is cut to the predetermined length so as to form the square log into, for example, a square bar shape.

The method for forming the front surface layer 42 at the surface of the core material is not specifically limited. As the method, an electrolytic plating process, an electroless plating process, a chemical vapor deposition method, a physical vapor deposition method, bonding a material of different kind (a clad metal material) where a cylindrical rod material is pasted on the core material and processed, or a similar method can be listed.

In the case where the electrolytic plating process or the electroless plating process forms the front surface layer 42 at the surface of the core material, to form the front surface layer 42 with the above-described composition, a composition, a current value, and a voltage value of a plating bath, a heat treatment condition, or a similar condition is regulated, and the plating process is performed. Platings with different compositions may be consecutively formed at the surface of the core material to be a multilayer structure. As the chemical vapor deposition method (CVD), MOCVD, PECVD, LPCVD, normal pressure CVD, CCVD, or a similar method can be listed. As the physical vapor deposition method (PVD), a vacuum deposition method, various sputtering methods such as a DC sputtering and a high frequency sputtering, various ion plating methods such as a high-frequency ion plating, a molecular beam epitaxy method, a laser ablation method, an ionized cluster beam deposition method, an ion beam deposition method, or a similar method can be listed.

As a method for manufacturing the tip 9 where the front surface layer 42 is formed at a part of the entire surface of the core material and a part of the main body portion 41 is exposed, for example, the following can be listed. One method is to form the front surface layer 42 at the entire surface of the core material, and then to cut the core material with the front surface layer 42 vertical to the axial line of this core material. Thus, the tip where the part of the main body portion is exposed is manufactured. Another method is to form the front surface layer 42 at the entire surface of the core material and to, for example, partially cut and chop off the front surface layer 42 for removal. Thus, the tip where the main body portion is exposed at any site of the tip is manufactured.

The tip 9 in this invention may perform a heat treatment manufacturing process in addition to the manufacturing process to form the diffusion layer, which is formed by mutual diffusion of the elements in the main body portion 41 and the front surface layer 42. The heat treatment manufacturing process is performed as follows. After forming the front surface layer 42 at the surface of the core material, for example, the front surface layer 42 is maintained at a temperature of 600 to 1300° C. for 0 to 10 hours. Maintaining for 0 hours means a temperature fall immediately after a temperature rise. The heating method is not especially limited. The heating may be performed by an atmospheric control with an electric furnace, or the heating may be performed with a burner. The heat treatment manufacturing process may be performed by several times.

To bond the tip to the center electrode 4, the tip may be manufactured by the method similar to the tip 9 to be bonded to the ground electrode 8. Alternatively, the tip may be manufactured by the conventionally-known method.

For the center electrode 4 and the ground electrode 8, for example, using a vacuum melting furnace, a hot metal alloy with a desired composition is prepared. The wire drawing treatment or a similar treatment is performed on this hot metal to appropriately adjust the hot metal to the predetermined shape and predetermined dimensions. Thus, the center electrode 4 and the ground electrode 8 can be fabricated. Assume the case where the center electrode 4 is formed of the outer layer and the core portion, which is disposed so as to be embedded into the axial center portion of this outer layer. For the center electrode 4, an inner material made of the Cu alloy, which exhibits higher coefficient of thermal conductivity than an outer material, or a similar material is inserted into the outer material made of the Ni alloy or a similar material formed into a cup. By plastic work such as an extrusion process, the center electrode 4 with the core portion at the inside of the outer layer is formed. The ground electrode 8 also may be formed of the outer layer and the core portion similar to the center electrode 4. In this case, similar to the center electrode 4, the inner material is inserted into the outer material formed into the cup, and the plastic work such as the extrusion process is performed. Then, the member on which the plastic work is performed to have an approximately prismatic shape can be the ground electrode 8.

Subsequently, to the end face of the metal shell 7 formed to be the predetermined shape by the plastic work or similar work, the one end portion of the ground electrode 8 is bonded by electrical resistance welding, laser beam welding, or a similar welding. Next, Zn plating or Ni plating is performed on the metal shell 7 to which the ground electrode 8 is bonded. After the Zn plating or the Ni plating, trivalent chromate treatment may be performed. The plating performed on the ground electrode may be peeled.

Next, the tip 9 fabricated as described above is melted and fixed to the ground electrode 8 by, for example, the resistance welding and/or the laser beam welding. In the case where the tip 9 is bonded to the ground electrode 8 by the resistance welding, for example, the tip 9 is installed at the predetermined position of the ground electrode 8 and the resistance welding is performed while pressing the tip 9. In the case where the tip 9 is bonded to the ground electrode 8 by the laser beam welding, for example, the tip 9 is installed at the predetermined position of the ground electrode 8. Then, laser beam is irradiated on a contact portion of the tip 9 and the ground electrode 8 from a direction parallel to the contact surface of the tip 9 and the ground electrode 8 partially or across the whole circumference. After performing the resistance welding, the laser beam welding may be performed. To bond the tip 9 with the front surface layer 42 at the entire surface of the main body portion 41 to the ground electrode 8, the tip 9 and the ground electrode 8 melt, possibly resulting in dispersion and accumulation of the melted particles to the periphery of the bonding portion. This fails to maintain the quality of the spark plug, possibly resulting in a manufacturing failure. On the other hand, if the front surface layer 42 is not disposed at the surface of the tip 9 to be bonded to the ground electrode 9 and the main body portion 41 is exposed at the tip 9, when bonding the tip 9 to the ground electrode 8, this allows preventing the melted particles from the tip 9 and the ground electrode 8 from dispersing. This also allows reducing a count of the spark plug resulting in manufacturing failure. Accordingly, in that the count of spark plugs resulting in manufacturing failure can be reduced, the tip 9 is preferable whose main body portion is exposed at the surface of the tip 9 to be bonded to the ground electrode 8. In the case where the tip is bonded to the center electrode 4, the tip can be bonded by the method similar to bonding the tip 9 to the ground electrode 8.

Meanwhile, the insulator 3 is fabricated by sintering ceramic or a similar material into a predetermined shape. The center electrode 4 is disposed to be inserted into the axial hole 2 of this insulator 3. The composition forming the first seal body 22, the composition forming the resistor 21, and the composition forming the second seal body 23 are pre-compressed into the axial hole 2 in this order for filling the axial hole 2. Next, while press-fitting the terminal metal fitting 5 from the end portion in the axial hole 2, the compositions are compressed and heated. Thus, the compositions are sintered, forming the resistor 21, the first seal body 22, and the second seal body 23. Next, to metal shell 7 to which the ground electrode 8 is bonded, the insulator 3 to which this center electrode 4 or a similar member is secured is assembled. Finally, the distal end portion of the ground electrode 8 is bent toward the center electrode 4 side such that the one end of the ground electrode 8 is opposed to the distal end portion of the center electrode 4, thus manufacturing the spark plug 1.

The spark plug 1 according to the present invention is used as an ignition plug for the internal combustion engine for vehicles, for example, a gasoline engine. The spark plug 1 has a screw hole at a head (not shown), which defines and forms the combustion chamber of the internal combustion engine. The screw portion 24 is screwed with the screw hole to secure the spark plug 1 to the predetermined position. The spark plug 1 according to this invention is also applicable to any internal combustion engine. Even if the spark plug 1 according to the present invention is used in the combustion chamber at a high temperature and high oxygen concentration, the tip is placed under conditions where the intake air gas is likely to directly hit the surface of the tip, and oxygen concentration and the temperature at the periphery of the tip widely change, the spark plug 1 can reduce the abnormal erosion at the side surface of the tip. Accordingly, the spark plug 1 is, for example, particularly suitable for the internal combustion engine such as a direct-injection gasoline engine operated in the lean burn state.

The spark plug 1 according to the present invention is not limited to the above-described embodiments, and various modifications can be performed within the range which can achieve the object of the invention. For example, with the spark plug 1, the front end surface of the center electrode 4 and the front end surface of the tip 9, which is disposed at the ground electrode 8, are opposed via the gap G in the axial line O direction. However, with this invention, as shown in FIG. 4, the side surfaces of the tip 309, which is disposed at the center electrode 104, and the front end surfaces of the tips 109 and 209, which are disposed at the ground electrodes 108 and 208, may be disposed to be opposed via the gap G' in the radial direction of the center electrode. In this case, the ground electrodes, which are opposed to the side surfaces of the tip 309 disposed at the center electrode, may be disposed by a single or plural.

WORKING EXAMPLES

Fabrication of Specimen of Spark Plug (Test Numbers 1 to 59)

The tip with front surface layer, which has the front surface layer, was manufactured as follows. A core material, which became the main body portion, was manufactured. Then, by the electrolytic plating process or bonding the material of different kind (the clad metal), the front surface layer was formed at the surface of this core material.

To form the front surface layer by the electrolytic plating process, the core material was obtained as follows. Raw material powders with a predetermined composition were combined, and arc melting was performed on the powder to form an ingot. Hot forging, hot rolling, and hot swaging were performed on this ingot. Furthermore, the wire drawing treatment was performed to form a round rod material at the diameter of 0.35 mm and a predetermined length. At the side peripheral surface of this round rod material, the electrolytic plating process formed a front surface layer with the predetermined composition. Thereafter, the round rod material was cut to a predetermined length, thus obtaining the tip with front surface layer. The tip with front surface layer includes the column-shaped main body portion at the diameter of 0.35 mm and the height of 0.6 mm. The tip with front surface layer includes the front surface layer at the side peripheral surface of the main body portion.

To form the front surface layer by bonding the material of different kind (the clad metal), the core material was obtained as follows. Raw material powders with a predetermined composition were combined, and arc melting was performed on the powder to form an ingot. Hot forging, hot rolling, and hot swaging were performed on this ingot. Furthermore, the wire drawing treatment was performed to form a round rod material at a predetermined length. To the side peripheral surface of this round rod material, a cylindrical material equivalent to the front surface layer with the predetermined composition was bonded, and the wire drawing treatment was performed. Thereafter, the round rod material was cut to a predetermined length, thus obtaining the tip with front surface layer. The tip with front surface layer includes the column-shaped main body portion at the diameter of 0.35 mm and the height of 0.6 mm. The tip with front surface layer includes the front surface layer at the side peripheral surface of the main body portion.

In the case where the front surface layer was formed at the surface of the main body portion by any of the methods as well, when performing the heat treatment on the tip as necessary after forming the front surface layer, the elements diffused between the main body portion and the front surface layer, thus forming the diffusion layer. Accordingly, the diameter of the main body portion became less than 0.35 mm.

Subsequently, the tip without front surface layer was formed as follows similar to the core material for the tip with front surface layer. The round rod material at the diameter of 0.35 mm was formed. This round rod material was cut to a predetermined length, thus forming the column-shaped tip without front surface layer at the diameter of 0.35 mm and the height of 0.6 mm.

The heat treatment manufacturing process was performed on a part of the obtained tip with front surface layer. The heat treatment manufacturing process maintained the tip with front surface layer at a predetermined temperature within a range of 600 to 1300° C. in the electric furnace for predetermined hours within a range of 0 to 10 hours. Thus, the diffusion layer was formed between the main body portion and the front surface layer.

The resistance welding was performed on the obtained tip without front surface layer and the tip with front surface layer (may be referred to as the tip) to a ground electrode formed of an inconel 601. Then, the tip and the ground electrode were bonded by the laser beam welding. Thus, the spark plug specimen with the structure shown in FIG. 1 was manufactured.

(Test Numbers 60 to 81)

The diameter of the main body portion was changed to 0.7 mm, and the thickness of the front surface layer and the compositions of the main body portion and the front surface layer were changed. Otherwise, the spark plug specimens were manufactured similar to the test numbers 1 to 59. The main body portion contains Pt as the main constituent and Rh of 10%. The elements other than Ni in the front surface layer were fabricated so as to be only the elements contained in the main body portion.

(Test Numbers 82 to 90)

As shown in Table 5, the radius of the tips was changed. Otherwise, the spark plug specimens were manufactured similar to the test numbers 9 and 19. Together with this, for "Evaluation for Abnormal Erosion", which will be described later, as a sample used for measuring an abnormal erosion start time $t_1$ at the use of the tip without front surface layer, the spark plug specimens with the tip without front surface layer having the radius identical as the test numbers 82 to 90 were fabricated.

Methods for Measuring Composition of Tip and Thickness of Front Surface Layer

Mass compositions of the compositions of the tips were measured by WDS analysis with an EPMA (JXA-8500F manufactured by JEOL Ltd.). Regarding the composition of the main body portion, the tip was cut off at the plane including the axial line A of the tip. As described above, the mass composition near the center of this cut cross section was measured (acceleration voltage: 20 kV, spot diameter: 100 μm). Regarding the composition of the front surface layer, the spot diameter was set to 1 μm. The mass composition was measured on the any given two line segments L, which are in the direction perpendicular to the axial line A at the cut cross section at intervals of 1 μm. The end portions of the cut cross section, that is, from the end portion to the other end of the line segment L, the content proportion of Ni at the position of 2 μm was measured. Arithmetic mean values of these measured values are indicated as surface Ni content proportions in Table 1. The meanings of the signs in the columns of "Contained Element other than Ni" at the front surface layer in Table 1 are as follows. Assume the case where the constituent other than Ni is designed as 100 mass %. "*1" indicates that the front surface layer has the identical composition as the main body portion. "*2" indicates that the elements other than Ni are only the elements contained in the main body portion (the composition differs). "Pt" indicates that the constituents other than Ni is only Pt. Other signs indicate a constituent ratio when designing the constituent including Ni as 100 mass %.

Regarding the thickness of the front surface layer, the mass composition was measured from the end portion toward the other end of the two line segments L. Then, the length of the part where the content proportion of Ni becomes 8 mass % or more was obtained. Arithmetic mean values of these values are shown as the thickness of the front surface layer in Table 1. If the surface Ni content proportion was less than 8 mass %, as the thickness of the front surface layer, the mass composition was measured from the end portion toward the other end of the line segment L. Then, the length of the part where the content proportion of Ni became 80% of the surface Ni content proportion was regarded as the thickness of the front surface layer. The mass composition was measured from the end portion toward the other end of the line segment L. When the part where the content proportion of Ni gradually fluctuates is 2 μm or more, it is determined that the diffusion layer was present.

Method for Measuring Ni and Low-Melting Point Element

As shown in FIG. 2, the tip was cut at the position of 0.2 mm from the surface of the tip forming the gap G to the opposite side from the side that the gap G is positioned. Disk-shaped bodies at the distal end side of the tips were dissolved by a required quantity. After that, the chemical analysis (ICP emission spectrometry) measured the mass proportion of Ni and the elements having lower melting point than Ni. The measurement results are shown in Table 3.

Method for Durability Test

The manufactured spark plug specimen was mounted to an engine with supercharger for testing (initial spark discharge voltage: 20 kV or more, a displacement: 660 cc, and three cylinders). The ground electrode was adjusted to a position of not disturbing a flow of the intake air gas such that the intake air gas was likely to directly hit the tip disposed at the ground electrode. The durability test was conducted at an Air/Fuel ratio (air/fuel) of 11.3, at full throttle with a state of an engine revolution of 6000 rpm maintained, and the engine was operated for 100 hours. A measured temperature at a position of 1 mm from a distal end of a ground electrode base material with a thermocouple was 950° C.

Evaluation for Abnormal Erosion

In the durability test, if wear was observed at a site of the tip where the intake air gas directly hits, it was determined that the abnormal erosion occurred. In this case, start time of the abnormal erosion was measured. An abnormal erosion start time $t_1$ is time when using the tip without front surface layer. An abnormal erosion start time $t_2$ is time when using the tip with front surface layer that has the front surface layer at the surface of the main body portion with the identical composition as the tip without front surface layer. A ratio of the abnormal erosion start time $t_2$ to the abnormal erosion start time $t_1$ ($t_2/t_1$) was calculated. The abnormal erosion was evaluated in accordance with the following criteria. The results are shown in Tables 1 and 2.

A: The ratio ($t_2/t_1$) is 2.5 or more.
B: The ratio ($t_2/t_1$) is 2 or more to less than 2.5
C: The ratio ($t_2/t_1$) is 1.5 or more to less than 2.
D: The ratio ($t_2/t_1$) is 1.3 or more to less than 1.5.
E: The ratio ($t_2/t_1$) is less than 1.3.
F: No abnormal erosion occurs at the tip without front surface layer.

TABLE 1

| Test Number | Composition of Main Body Portion (Mass %) | | | | | | | | | Front Surface Layer | | | | Manufacturing Method | Abnormal Erosion |
|---|---|---|---|---|---|---|---|---|---|---|---|---|---|---|---|
| | Pt | Rh | Ir | Re | W | Ni | Pd | Co | Fe | Surface Ni Content Proportion Mass % | Contained Element other than Ni | Thickness μm | Presence/Absence of Diffusion Layer | | |
| 1 | 90 | | | | | 10 | | | | — | — | — | Without | — | — |
| 2 | 87 | 5 | | | | 8 | | | | — | — | — | Without | — | — |
| 3 | 100 | | | | | | | | | — | — | — | Without | — | — |
| 4 | 55 | 0 | 45 | | | | | | | — | — | — | Without | — | — |
| 5 | 80 | 0 | 20 | | | | | | | — | — | — | Without | — | — |
| 6 | 96 | 4 | | | | | | | | — | — | — | Without | — | — |
| 7 | 95 | 5 | | | | 0 | | | | 7 | Pt | 50 | Without | Clad Metal | E |
| 8 | 95 | 5 | | | | 0 | | | | 8 | *2 | 1 | With | Plating | E |
| 9 | 95 | 5 | | | | 0 | | | | 8 | *2 | 2 | With | Plating | C |
| 10 | 95 | 5 | | | | 0 | | | | 8 | *2 | 10 | With | Plating | C |
| 11 | 95 | 5 | | | | 0 | | | | 8 | *1 | 50 | Without | Clad Metal | C |
| 12 | 95 | 5 | | | | 0 | | | | 8 | *1 | 150 | With | Clad Metal | C |
| 13 | 95 | 5 | | | | 0 | | | | 8 | Pt | 150 | Without | Clad Metal | C |
| 14 | 95 | 5 | | | | 0 | | | | 8 | Pt = 82%, Ir = 10% | 150 | Without | Clad Metal | C |
| 15 | 95 | 5 | | | | 0 | | | | 20 | *2 | 2 | With | Plating | C |
| 16 | 95 | 5 | | | | 0 | | | | 20 | Pt | 50 | Without | Clad Metal | C |
| 17 | 95 | 5 | | | | 0 | | | | 40 | *2 | 2 | With | Plating | B |
| 18 | 95 | 5 | | | | 0 | | | | 70 | *2 | 2 | With | Plating | B |
| 19 | 95 | 5 | | | | 0 | | | | 100 | — | 2 | Without | Plating | B |
| 20 | 95 | 5 | | | | 0 | | | | 100 | — | 5 | Without | Plating | B |
| 21 | 95 | 5 | | | | 0 | | | | 100 | — | 15 | Without | Plating | B |
| 22 | 93 | 5 | | | | 2 | | | | 100 | — | 15 | Without | Plating | C |
| 23 | 94 | 5 | | | | 1 | | | | 8 | *2 | 2 | With | Plating | C |
| 24 | 93 | 5 | | | | 2 | | | | 8 | *2 | 2 | With | Plating | D |
| 25 | 88 | 5 | | | | 7 | | | | 8 | *2 | 2 | With | Plating | D |
| 26 | 88 | 5 | | | | 7 | | | | 40 | *2 | 2 | With | Plating | C |
| 27 | 88 | 5 | | | | 7 | | | | 70 | *2 | 2 | With | Plating | C |
| 28 | 88 | 5 | | | | 7 | | | | 100 | — | 2 | Without | Plating | C |
| 29 | 90 | 5 | 5 | | | | | | | 8 | *1 | 2 | With | Plating | C |
| 30 | 90 | 5 | 5 | | | | | | | 100 | — | 2 | Without | Plating | B |
| 31 | 85 | 15 | | | | | | | | 7 | *2 | 2 | With | Plating | E |
| 32 | 85 | 15 | | | | | | | | 8 | *2 | 1 | With | Plating | E |
| 33 | 85 | 15 | | | | | | | | 8 | *2 | 2 | With | Plating | C |
| 34 | 65 | 15 | 20 | | | | | | | 8 | *2 | 2 | With | Plating | C |
| 35 | 85 | 15 | | | | | | | | 8 | Pt | 50 | Without | Clad Metal | C |

TABLE 1-continued

| | Composition of Main Body Portion (Mass %) | | | | | | | | Front Surface Layer | | | | | |
|---|---|---|---|---|---|---|---|---|---|---|---|---|---|---|
| Test Number | Pt | Rh | Ir | Re | W | Ni | Pd | Co | Fe | Surface Ni Content Proportion Mass % | Contained Element other than Ni | Thickness μm | Presence/ Absence of Diffusion Layer | Manufacturing Method | Abnormal Erosion |
| 36 | 85 | 15 | | | | | | | | 8 | Pt | 100 | Without | Clad Metal | C |
| 37 | 85 | 15 | | | | | | | | 30 | Pt | 50 | Without | Clad Metal | C |
| 38 | 84 | 15 | | | | 1 | | | | 40 | *2 | 2 | With | Plating | B |
| 39 | 83 | 15 | | | | 2 | | | | 40 | *2 | 2 | With | Plating | C |
| 40 | 85 | 15 | | | | | | | | 50 | *2 | 2 | With | Plating | B |
| 41 | 85 | 15 | | | | | | | | 70 | *2 | 2 | With | Plating | B |
| 42 | 85 | 15 | | | | | | | | 100 | — | 2 | Without | Plating | B |
| 43 | 84 | 15 | | | | 1 | | | | 8 | *1 | 50 | Without | Clad Metal | C |
| 44 | 78 | 15 | | | | 7 | | | | 8 | *1 | 50 | Without | Clad Metal | D |
| 45 | 78 | 15 | | | | 7 | | | | 100 | — | 2 | Without | Plating | C |
| 46 | 78 | 15 | | | 7 | | | | | 8 | Pt | 50 | Without | Clad Metal | C |
| 47 | 71 | 15 | | | 7 | 7 | | | | 8 | Pt | 50 | Without | Clad Metal | D |
| 48 | 78 | 15 | | | | | 7 | | | 8 | Pt | 50 | Without | Clad Metal | C |
| 49 | 75 | 15 | | | | | | 10 | | 8 | Pt | 50 | Without | Clad Metal | C |
| 50 | 78 | 15 | | | | | | | 7 | 8 | Pt | 50 | Without | Clad Metal | C |
| 51 | 55 | 45 | | | | | | | | 8 | Pt | 50 | With | Clad Metal | C |
| 52 | 70 | 20 | 10 | | | | | | | 8 | Pt | 50 | With | Clad Metal | C |
| 53 | 70 | 20 | | 10 | | | | | | 8 | Pt | 50 | With | Clad Metal | C |
| 54 | 70 | 20 | | | 10 | | | | | 8 | Pt | 50 | With | Clad Metal | C |
| 55 | 45 | 35 | 20 | | | | | | | 7 | Pt | 50 | With | Clad Metal | E |
| 56 | 45 | 35 | 20 | | | | | | | 8 | Pt | 50 | With | Clad Metal | C |
| 57 | 45 | 35 | 20 | | | | | | | 100 | — | 2 | Without | Plating | B |
| 58 | 60 | 10 | 30 | | | | | | | 8 | *1 | 50 | With | Clad Metal | C |

TABLE 2

| | Composition of Main Body Portion (Mass %) | | | | | | | | | Front Surface Layer | | | |
|---|---|---|---|---|---|---|---|---|---|---|---|---|---|
| Test Number | Pt | Rh | Ir | Re | W | Ni | Pd | Co | Fe | Composition Mass % | Thickness μm | Presence/Absence of Diffusion Layer | Abnormal Erosion |
| 20 | 95 | 5 | | | | 0 | | | | Ni100 | 5 | Without | B |
| 59 | 95 | 5 | | | | 0 | | | | Ag100 | 5 | Without | E |

Evaluation for Wear Resistance

The length of the gap G was measured before and after the durability test. An increased amount of the gap G before and after the durability test was calculated. An increased proportion of gap of an amount of increased gap $H_2$ when using the tip with front surface layer with respect to an amount of increased gap $H_1$ when using the tip without front surface layer: $\{(H_2-H_1)/H_1\} \times 100$ was calculated. The wear resistance was evaluated in accordance with the following criteria. The results are shown in Table 3.

D: When the increased proportion of gap is 20% or less
F: When the increased proportion of gap is more than 20%

TABLE 3

| Test Number | Front Surface Layer Surface Ni Content Proportion Mass % | Mass Proportion of Low-Melting Point Element at Specific Region (Mass %) | | | | | | Presence/ Absence of Diffusion Layer | Increased Proportion of Gap |
|---|---|---|---|---|---|---|---|---|---|
| | | Ni | Cu | Au | Ag | Mn | Total | | |
| 60 | 8 | 1 | | | | | 1 | Without | D |
| 61 | 8 | 3 | | | | | 3 | Without | D |
| 62 | 8 | 5 | | | | | 5 | Without | D |
| 63 | 8 | 7 | | | | | 7 | Without | D |
| 64 | 8 | 7 | | | | | 7 | With | D |
| 65 | 8 | 8 | | | | | 8 | Without | F |
| 66 | 8 | 5 | 2 | | | | 7 | Without | D |
| 67 | 8 | 5 | | 1 | 1 | | 7 | Without | D |
| 68 | 8 | 5 | | | 2 | | 7 | Without | D |
| 69 | 8 | 5 | 3 | | | | 8 | Without | F |
| 70 | 40 | 1 | | | | | 1 | Without | D |
| 71 | 40 | 3 | | | | | 3 | Without | D |
| 72 | 40 | 5 | | | | | 5 | Without | D |
| 73 | 40 | 7 | | | | | 7 | Without | D |
| 74 | 40 | 7.5 | | | | | 7.5 | Without | F |
| 75 | 100 | 1 | | | | | 1 | Without | D |

TABLE 3-continued

| Test Number | Front Surface Layer Surface Ni Content Proportion Mass % | Mass Proportion of Low-Melting Point Element at Specific Region (Mass %) | | | | | | Presence/Absence of Diffusion Layer | Increased Proportion of Gap |
|---|---|---|---|---|---|---|---|---|---|
| | | Ni | Cu | Au | Ag | Mn | Total | | |
| 76 | 100 | 3 | | | | | 3 | Without | D |
| 77 | 100 | 5 | | | | | 5 | Without | D |
| 78 | 100 | 7 | | | | | 7 | Without | D |
| 79 | 100 | 3 | 4 | | | | 7 | Without | D |
| 80 | 100 | 7.8 | | | | | 7.8 | Without | F |

Evaluation Depending on Difference of Covering Portion of Front Surface Layer to Main Body Portion A welding test where the resistance welding was performed on the tip of the test number 10 and the ground electrode was conducted by 1000 pieces of tips. The welding was performed such that the dimension from the ground electrode to the distal end of the tip after welding became smaller than the height of the tip before welding by 0.1 mm. After that, when the tip and the ground electrode melted, the metal particles dispersed, it was observed that the metal particles accumulated to the periphery of the bonding portion, and the diameter of the metal particles was 0.1 mm or more, it was determined that the spatter occurred. In this case, the tips where the spatter occurred were counted. The front surface layer was disposed at the entire surface of the main body portion. Otherwise, the tip of test number 81 is the identical to the test number 10. The tip of test number 81 was tested similar to the test number 10. The rate of spatter was evaluated in accordance with the following criteria. The results are shown in Table 4.

D: The spatter ratio is less than 3%.
F: The spatter ratio is 3% or more.

TABLE 4

| Test Number | Covering Portion of Front Surface Layer to Main Body Portion | Spatter Ratio |
|---|---|---|
| 10 | Side Peripheral Surface of Main Body Portion | D |
| 81 | Entire Surface of Main Body Portion | F |

Evaluation for Abnormal Erosion Depending on Difference in Tip Diameter

As shown in Table 5, the radius of the column-shaped tip was changed. Otherwise, the evaluation was conducted similar to the "Evaluation for Abnormal Erosion" using the spark plug specimen with the tip similar to the test numbers 9 and 19. The start time of abnormal erosion $t_2$ of the tips with front surface layer of test numbers 82 to 90 as shown in Table 5 and the start time of abnormal erosion $t_1$ of the tips without front surface layer with the identical radius were measured, and the ratio ($t_2/t_1$) was calculated. The abnormal erosion was evaluated from the calculated values.

TABLE 5

| | | Front Surface Layer | | | | |
|---|---|---|---|---|---|---|
| Test Number | Radius of tip mm | Surface Ni Content Proportion Mass % | Contained Element other than Ni | Thickness μm | Presence/Absence of Diffusion Layer | Abnormal Erosion |
| 82 | 0.3 | 8 | *2 | 2 | With | C |
| 84 | 0.33 | 8 | *2 | 2 | With | B |
| 85 | 0.5 | 8 | *2 | 2 | With | B |
| 86 | 0.3 | 100 | — | 2 | Without | B |
| 88 | 0.33 | 100 | — | 2 | Without | A |
| 89 | 0.5 | 100 | — | 2 | Without | A |
| 90 | 0.6 | 100 | — | 2 | Without | A |

As shown in Table 1, the abnormal erosion did not occur in the tips of test numbers 1 to 6 with the composition outside the range of the composition of the main body portion in the present invention. Accordingly, it was found that the abnormal erosion occurred at the tip with a specific composition. As shown in Table 1, compared with the tip without front surface layer, which did not have the front surface layer, the tip with front surface layer that had the front surface layer containing Ni of 8 mass % or more and at the thickness of 2 μm or more reduced the abnormal erosion. On the other hand, the tip with front surface layer that had the front surface layer not meeting any one of the conditions of the content proportion of Ni being 8 mass % or more and the thickness of 2 μm or more did not reduce the abnormal erosion. The tips of test numbers 14, 29, 30, 52, 53, and 54 generated fine cracks at a boundary part between the main body portion and the front surface layer. The tips of the test numbers 34, 55, 56, and 57 generated further larger cracks at the boundary part between the main body portion and the front surface layer. The tip of the test number 58 generated larger cracks at the boundary part between the main body portion 41 and the front surface layer 42.

As shown in Table 2, the tip of the test number 20 with the front surface layer containing Ni of 100% reduced the abnormal erosion. In contrast to this, the tip of the test number 59 with the front surface layer containing Ag of 100% did not reduce the abnormal erosion. This found that disposing the front surface layer containing Ni allows reducing the abnormal erosion.

As shown in Table 3, the following was found. If the content proportion of Ni and a low-melting point element within the range of thickness 0.2 mm from the front end surface of the tip is 7 mass % or less, this allows maintaining the wear resistance that is not inferior to the tip without the front surface layer.

As shown in Table 4, compared with the tip of the test number 81 where the front surface layer was disposed at the entire surface of the main body portion, the tip of the test number 10 where the front surface layer was disposed at only the side peripheral surface of the main body portion exhibited low spatter ratio. Accordingly, the tip with the front surface layer at only the side peripheral surface of the main body portion can reduce the manufacturing failure during manufacturing of the spark plug.

As shown in Table 5, the larger the radius of the tip is, the more the abnormal erosion can be reduced. Accordingly, it is found that the larger the radius of the tip by which the intake air gas is likely to directly hit and the abnormal erosion is likely to occur, the higher reduction effect of the abnormal erosion the tip of the present invention exhibits.

DESCRIPTION OF REFERENCE SIGNS 1, 101 Spark plug
2 Axial hole
3 Insulator
4, 104 Center electrode
5 Terminal metal fitting
6 Connecting portion
7 Metal shell
8, 108, 208 Ground electrode
9, 109, 209, 309 Tip
11 Rear end body portion
12 Large-diameter portion
13 Front end body portion
14 Insulator nose portion
15 Shelf portion
16 Collar portion
17 Step part
18 Tapered portion
19 Plate packing
21 Resistor
22 First seal body
23 Second seal body
24 Screw portion
25 Gas seal portion
26 Tool engagement portion
27 Crimping portion
28, 29 Packing
30 Talc
32 Projection portion
34 Rear end portion
35 Rod-shaped portion
41 Main body portion
42 Front surface layer
43 Fusion portion
G, G' Spark discharge gap Having described the invention, the following is claimed:

1. A spark plug comprising:
   a center electrode; and
   a ground electrode disposed providing a gap with the center electrode,
   wherein at least one of the center electrode and the ground electrode includes a tip forming the gap,
   wherein the tip includes a main body portion and a front surface layer,
   wherein the main body portion is composed of Pt as a main constituent, Rh of 5 mass % or more, and Ni of 0 mass % or more to less than 8 mass %,
   wherein the front surface layer extends around a perimeter of the main body portion and is disposed at least at a surface among the main body portion that is radially outside of an axial line extending in a direction from a center of the main body portion to the gap such that an intake air gas directly hits the front surface layer,
   wherein the front surface layer contains Ni of 8 mass % or more and less than 10 mass % of one or more elements having lower melting points than Ni,
   wherein the front surface layer has a thickness of 2 μm or more, and
   wherein, for a region of the tip defined by an outer circumferential surface of the tip, a front end surface of the tip, and a plane of the tip that is parallel to the front end surface of the tip and 0.2 mm away from the front end surface of the tip, a total content proportion of Ni and the one or more elements to a total mass of the region is 7 mass % or less.

2. The spark plug according to claim 1, wherein the main body portion is composed of Ni of 0 mass % or more to 1 mass % or less.

3. The spark plug according to claim 1, wherein the front surface layer contains Ni of 40 mass % or more.

4. The spark plug according to claim 1, wherein the center electrode including the tip or the ground electrode including the tip is respectively comprised of:
   the center electrode or the ground electrode; and
   a surface of the tip bonded to the center electrode or the ground electrode at which the main body portion is exposed.

5. The spark plug according to claim 1, wherein when the tip projects from the ground electrode by 0.15 mm or more and a cross section in a radial direction of an axial line direction extending in a direction from a center of the main body portion to the gap at any given position of the tip projecting by 0.15 mm or more is observed, at an outer peripheral surface in contact with an atmosphere, a part of a curvature radius R of 0.33 mm or more is present.

6. A spark plug comprising:
   a center electrode; and
   a ground electrode disposed providing a gap with the center electrode,
   wherein at least one of the center electrode and the ground electrode includes a tip forming the gap,
   wherein the tip includes a main body portion and a front surface layer,
   wherein the main body portion is composed of Pt as a main constituent, Rh of 5 mass % or more, and Ni of 0 mass % or more to less than 8 mass %,
   wherein the front surface layer extends around a perimeter of the main body portion and is disposed on at least a surface among the main body portion that is exposed radially outside of an axial line extending in a direction from a center of the main body portion to the gap,
   wherein the front surface layer contains Ni of 8 mass % or more and less than 10 mass % of one or more elements having lower melting points than Ni,
   wherein the front surface layer has a thickness of 2 μm or more, and
   wherein, for a region of the tip defined by an outer circumferential surface of the tip, a front end surface of the tip, and a plane of the tip that is parallel to the front end surface of the tip and 0.2 mm away from the front end surface of the tip, a total content proportion of Ni and the one or more elements to a total mass of the region is 7 mass % or less.

* * * * *